United States Patent [19]

Suzumori et al.

[11] Patent Number: 4,620,970
[45] Date of Patent: Nov. 4, 1986

[54] METHOD FOR GENERATION OF OXYGEN GAS

[75] Inventors: Takeo Suzumori; Jun Kokubu; Minoru Kubota, all of Yokkaichi, Japan

[73] Assignee: Mitsubishi Gas Chemical Company, Inc., Tokyo, Japan

[21] Appl. No.: 676,849

[22] Filed: Nov. 30, 1984

[30] Foreign Application Priority Data

Dec. 6, 1983 [JP]  Japan .................................. 58-230431

[51] Int. Cl.$^4$ ......................... C01B 13/00; C09K 3/00
[52] U.S. Cl. ................................ 423/579; 252/186.38; 252/186.42; 252/186.43
[58] Field of Search ....................... 252/186.42, 186.43, 252/186.38; 423/579

[56] References Cited

U.S. PATENT DOCUMENTS

| | | | |
|---|---|---|---|
| 3,156,654 | 11/1964 | Konecny et al. | 252/186.38 X |
| 3,421,842 | 1/1969 | Darbee et al. | 423/279 |
| 3,583,924 | 6/1971 | Demangeon et al. | 252/186.38 X |
| 3,884,836 | 5/1975 | Kühl et al. | 423/579 X |
| 4,414,127 | 11/1983 | Fu | 252/186.42 X |

FOREIGN PATENT DOCUMENTS

| | | | |
|---|---|---|---|
| 1472 | 1/1973 | Japan | 252/186.38 |
| 122703 | 7/1985 | Japan | 423/579 |

OTHER PUBLICATIONS

Hawley, G. G. (Ed.), *The Condensed Chemical Dictionary*, 9th Ed. Van Nostrand Reinhold Co., N.Y., (1977), "Carboxylic Acid" p. 166.

Hawley, Gessner G. (Ed.), *The Condensed Chemical Dictionary*, 9th Ed., 1977, Van Nostrand Reinhold Co., NY, pp. 211, 533-534, 838-839.

*Primary Examiner*—John F. Terapane
*Assistant Examiner*—Matthew A. Thexton
*Attorney, Agent, or Firm*—Leydig, Voit & Mayer, Ltd.

[57] ABSTRACT

A method for generating oxygen gas by contacting a peroxygen compound in water with a catalyst composed of a cobalt salt and an organic carboxylic acid or a salt thereof wherein the carboxylic acid has at least one hydroxyl group and at least one carboxyl group.

6 Claims, No Drawings

METHOD FOR GENERATION OF OXYGEN GAS

BACKGROUND OF THE INVENTION

1. Field of the Invention:

This invention relates to a method for generating oxygen gas using chemicals. More specifically, it relates to an improved catalyst, consisting at least in part of a cobalt salt and an organic acid or a salt thereof, for generating oxygen gas by contact with a peroxygen compound such as sodium percarbonate in water.

This invention may be used in emergency oxygen generators, medical equipment, beauty equipment and the like as an effective means for generating oxygen gas.

2. Description of the Prior Art

Until now, oxygen cylinders have been the primary source of oxygen used in evacuation from a fire, oxygen deficiency accidents during underground construction, and other situations requiring an emergency oxygen supply. However, in addition to being heavy and unwieldy, oxygen cylinders are expensive, require expert skill in handling, and carry with them a host of other complications related to actual use.

In recent years, a number of proposals have been made dealing with oxygen gas generation methods and devices that are small and lightweight, and the handling and operation of which requires no special expertise. Among these are methods that involve contacting a decomposition catalyst with a peroxygen compound such as hydrogen peroxide solution, sodium percarbonate, sodium perborate, and the like. For example, methods using such metallic compounds as Mn, Fe, Ni, Co, Cu, Pb, Cr, V, and W as catalysts (see Japanese Unexamined patent applications Nos. 54-26988, 54-26989, 54-26990, and 54-26991, for example) have been disclosed. Another type of method uses polyhydric alcohols or salts as oxygen generation regulators, in addition to the above-mentioned catalysts (e.g., Japanese Unexamined patent application 54-109091).

However, known catalyst systems such as those mentioned above are inadequate for generating a constant and continuous flow of oxygen gas. In addition, these react with sodium percarbonate or sodium perborate and the like, to form hydroxides or oxide precipitates. Furthermore, these catalysts are difficult to handle and dispose of, and are visually unappealing, making them undesirable for use in medical and beauty salon equipment. Thus, a soluble catalyst on which precipitate does not form is highly desirable.

SUMMARY OF THE INVENTION

Given these circumstances, the inventors conducted careful studies in an attempt to develop a superior catalyst composed of cobalt salt and carboxylic acid having at least one hydroxyl group and at least one carboxyl group, which when contacted with a peroxygen compound such as sodium percarbonate in water, will not form precipitate.

This invention relates to a method of generating oxygen gas by contacting in water a peroxygen compound with a catalyst composed of cobalt salt and organic carboxylic acid having at least one hydroxyl group and at least one carboxyl group, or the salt thereof.

A DETAILED DESCRIPTION OF THE INVENTION

The cobalt salts which are used as one component of the catalyst in this invention are cobalt sulfate, cobalt chloride, cobalt nitrate, cobalt acetate, and so on. Organic carboxylic acids having at least one hydroxyl group and at least one carboxyl group, or the salts thereof, such as citric acid, tartaric acid and malic acid, or their alkali metal salts, may be used.

The ratio by weight of the above-mentioned cobalt salt and organic carboxylic acid, or salt thereof, is 1 part cobalt salt to 0.1–10 parts organic carboxylic acid or the salt thereof, and preferably 0.5–3.0 parts. The ratio by weight of peroxygen compound and catalyst used is 1 part peroxygen component to 0.001–0.5 parts catalyst.

In this invention, the cobalt salt and organic carboxylic acid, or salt thereof, may or may not be mixed prior to contacting with the sodium percarbonate in water. The above organic carboxylates, particularly if the nitrate and acetate are used, should be employed separately, as they are likely to harden when mixed prior to use.

Sodium percarbonate and sodium perborate, the peroxygen compounds used in this invention, are in granular and powder form, and have been treated to prevent loss of active oxygen. These compounds may, as a result of such treatment, contain additives or be coated with a coating material. Sodium percarbonate is an adduct of sodium carbonate and hydrogen peroxide, and is expresssed with the formula $2Na_2CO_3 3H_2O_2$. Sodium perborate is obtained from sodium borate and hydrogen peroxide.

Sodium percarbonate is desirable because of its solubility in water and its ability to generate a constant, continuous, and relatively large flow of oxygen gas.

The amount of water used in this invention is determined by the amount of oxygen gas to be generated, the duration for which it is to be generated, and the capacity of the container used. The temperature of water used in this invention generally ranges from 22 degrees Centigrade to 28 degrees Centigrade.

When oxygen gas is generated according to this method, to generate 0.5–1.5 L/min over a 5–30 minute period, 0.5–2 liters of water is used, a quantity large in relation to the amount of gas generated. The amount of peroxygen compound used also is determined by the amount of oxygen gas to be generated, and the duration for which it is to be generated, as well as the capacity of the container; however, generally from 50 to 400 g is used.

According to this invention, 0.5–1.5 L/min of oxygen gas can be generated continuously at a constant rate over a period of 5 to 30 minutes. Moreover, there is no formation of precipitate in the fluid after generation. Because this is an aqueous solution, it is easy to handle. Disposal of waste fluid requires no special provisions since it can easily be disposed of down a drain, without fear of clogging drainpipes.

Several examples of this invention are given below.

EXAMPLE 1

Two liters of water were placed in a 2.5 liter generator. Two hundred grams of sodium percarbonate was then added, followed by 7 g of catalyst composed of 5 parts cobalt sulfate and 2 parts citric acid. The lid was then quickly closed. Next, the gas discharge pipe on the top of the generator was connected to a wet gas meter. Measurements of the flow of oxygen gas generated in this way show that over a 15-minute period, 1–1.2 L/min of oxygen gas was generated at a constant rate. The fluid remaining in the container after oxygen gas generation was a greenish aqueous solution containing no residue or precipitate.

EXAMPLE 2

The same test was performed in the same manner as Example 1, except for the substitution of 6 g of a catalyst composed of 3 parts cobalt sulfate and 3 parts tartaric acid. The results showed that over a 15-minute period, 0.9–1.3 L/min of oxygen gas was generated. There was no residue or precipitate in the fluid remaining in the container after oxygen gas generation.

EXAMPLE 3

The same test was conducted in the same manner as in Example 1, except for the substitution of 9 grams of a catalyst composed one part cobalt sulfate and 2 parts citric acid. The results show that, as in Example 1, over a 15-minute period, 0.8–1.5 L/min oxygen gas was generated, and again, there was no residue or precipitate in the fluid remaining in the container after generation.

EXAMPLE 4

The same test was conducted in the same manner as in Example 1, except for the substitution of 9 grams of a catalyst composed of 1 part cobalt chloride and 2 parts citric acid. The results show that, as in Example 1, over a 15-minute period, 1–1.5 L/min oxygen gas was generated, and again, there was no residue or precipitate in the fluid remaining in the container after generation.

EXAMPLE 5

1.5 liters of water was placed in a 2.5 liter generator. 200 grams of sodium percarbonate was added. Three grams of citric acid was then added, followed by five grams of cobalt acetate. The lid was then quickly closed. Measurements of the flow of oxygen gas generated in this way show that, as in Example 1, over a 15-minute period, 1–1.2 L/min of oxygen gas was generated at a constant rate. There was no residue or precipitate in the fluid remaining in the container after generation.

What is claimed is:

1. A method for generating oxygen gas in which a peroxygen compound is contacted in water with a catalyst composed of cobalt salt and an organic carboxylic acid or the salt thereof having at least one hydroxyl group and at least one carboxyl group.

2. A method according to claim 1, wherein the cobalt salt and the organic carboxylic acid or the salt thereof is used in a weight ratio of from 0.1 to 10 parts of the organic carboxylic acid or its salt per one part cobalt salt.

3. A method according to claim 1, wherein the catalyst is used in a weight ratio of from 0.001 to 0.5 parts of the catalyst per 1 part peroxygen compound.

4. A method according to claim 1, wherein the cobalt salt is a compound selected from the group consisting of cobalt sulfate, cobalt chloride, cobalt nitrate, and cobalt acetate.

5. A method according to claim 1, wherein the organic carboxylic acid or the salt thereof is a member of the group consisting of tartaric acid, citric acid, malic acid, and the alkali metal salts thereof.

6. A method according to claim 1, wherein the peroxygen compound is sodium percarbonate.

* * * * *